(No Model.)
A. G. HOHENSTEIN.
Car Coupling.
No. 229,411. Patented June 29, 1880.
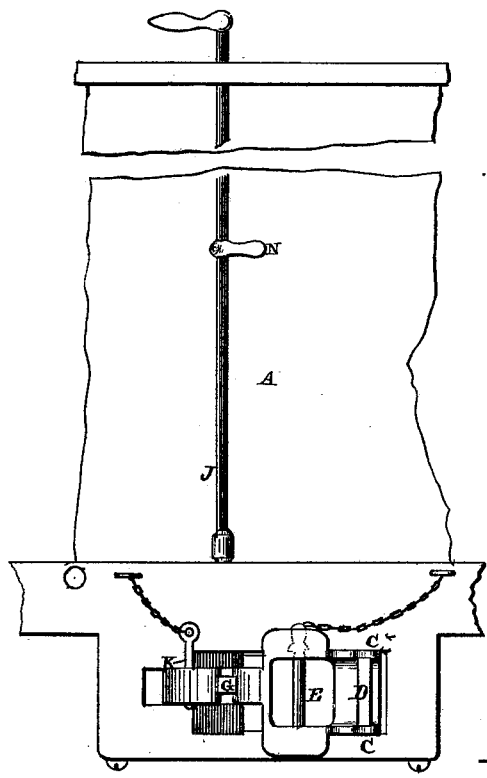
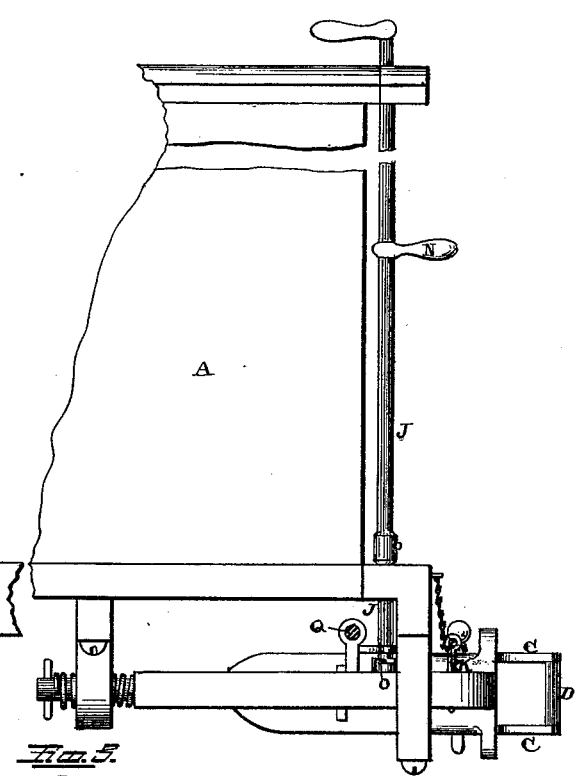
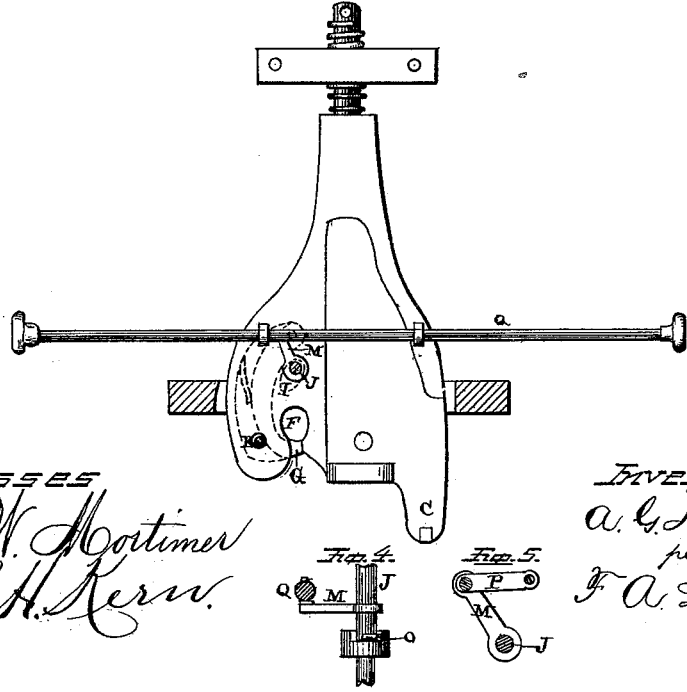
Witnesses
W. W. Mortimer
Will H. Kerr
Inventor
A. G. Hohenstein
per
F. A. Lehmann,
Atty

UNITED STATES PATENT OFFICE.

ARCHIE. G. HOHENSTEIN, OF NEW HAVEN, CONNECTICUT, ASSIGNOR OF ONE-HALF OF HIS RIGHT TO JOHN PARKER, OF SAME PLACE.

CAR-COUPLING.

SPECIFICATION forming part of Letters Patent No. 229,411, dated June 29, 1880.

Application filed May 11, 1880. (No model.)

*To all whom it may concern:*

Be it known that I, ARCHIE. G. HOHENSTEIN, of New Haven, in the county of New Haven and State of Connecticut, have invented certain new and useful Improvements in Car-Couplings; and I do hereby declare the following to be a full, clear, and exact description of the invention, such as will enable others skilled in the art to which it pertains to make and use it, reference being had to the accompanying drawings, which form part of this specification.

This invention relates to an improvement in car-couplings; and it consists in forming upon one side of the front end of the bumper-head two horizontal extension-arms, which are united at their front ends by means of a vertical rod, which rod catches in the coupling formed on one side of the bumper-head on the adjoining car, whereby when the cars run together they are coupled by a double coupling or fastening, one of which is attached to each car.

It further consists in forming two projecting arms from one corner of each bumper-head, which arms are united together by a coupling-rod, and placing in the other side of the head a spring coupling-hook, which locks the two heads together, and which hooks are operated by a special mechanism for this purpose, either from the top or the side of the cars, so that the brakeman need never go between the cars when they are running together, as will be more fully described hereinafter.

Figure 1 is a side elevation of the coupling. Fig. 2 is a front view of the same. Fig. 3 is a plan view of the coupling alone, showing the rod for operating the hook from either side of the car, and Figs. 4 and 5 are detail views.

A represents either a freight or passenger car, to which the bumper is applied in any suitable manner. The bumper-head has projecting from its front end, to one side of the center, the two horizontal arms C, which are united together at their front ends by means of a coupling-pin, D. The distance between these two horizontal arms should be sufficient to make up for the difference in the height between cars of different constructions, so that cars of different heights will couple when they run together. This construction for enabling cars of different heights to couple when they run together is of the greatest importance, because cars of different heights are constantly being coupled together, and unless some suitable provision is made for this difference in height considerable difficulty will be experienced in coupling trains together. To the inside of these horizontal arms there is made in the bumper-head the usual recess E, in which the ordinary coupling-links can be used so as to couple cars having the common form of bumper-head with cars having the form of bumper here shown as well as if all of the cars were provided with the same kind of bumpers. By providing the bumper-head with this recess E, so as to enable the common coupling-links to be used, a triple coupling is formed for each car, so as to make doubly sure in regard to the safety of the cars; and in case the form of coupling here shown should become broken or inoperative by having been tampered with in any manner the cars can be coupled together by the common links as well as with any of the bumper-heads now in use.

On the opposite side of the recess E from the two horizontal arms is formed a recess, F, into which the vertical coupling-rod on the bumper-head of the adjoining car runs, and back in this recess is pivoted the hook G. This hook has a spring placed against its inner side, so as to make it automatic in its operation, and it is operated by means of the cam I on the lower end of the operating-rod J, which extends from the top of the car, as shown. When the rod is so turned that the cam does not press against this hook the hook is ready to engage with the coupling-rod at any moment, and after the hook is caught behind the rod it can be readily locked in place by passing the pin K down through the bumper-head in the rear of the hook, so as to prevent the hook from moving. When the cam is turned so as to bear against the hook the hook is held back, so that even if the cars do run together they will not couple.

Each bumper-head being provided with a hook and a coupling-rod, as above described, when the cars run together a double coupling is made.

If so desired, either one of the hooks may be moved back out of position, so that the coupling will be made with one hook only, as will be found very convenient in switching cars.

When both couplings are made at the same time, in swinging a curve the bumpers, by their peculiar construction, draw from the center-pin of each truck, forming what is equivalent to one long coupling, and thereby preventing strain on any one particular part.

When the cars are at full speed they can be uncoupled without taking the slack of the train.

Each one of the bumper-heads is connected at its rear end to the car in any suitable manner, and the forward end has a suitable play back and forth in the frame in which it is supported; and in order to accommodate the operating-rod J to this lateral play a slot is made through the platform of the car, so as to let the rod move back and forth with the coupling. This rod is connected only at its upper end to the top of the car, where it is provided with a suitable operating lever or wheel, and at any suitable distance between the top of the car and the platform there is fastened to the rod an operating-lever, N. By means of the two devices the coupling can be operated either from the top of the car or from the platform.

Passing through the lower end of the rod, just above the top of the bumper-head, is a short pin, O, which plays back and forth between the two shoulders formed upon the bumper-head, and which pin thus acts as a stop to prevent the rod from being moved too far. Secured to this rod, just above this pin, is an arm, M, which extends backward, and which has pivoted to its rear end a connecting-link, P, for uniting the rod J to the horizontally-moving rod Q, which may be operated from either side of the car. When this rod Q is pushed or pulled from either side it operates the cam on the rod J inside of the bumper-head, so as to push the hook back, for the purpose of uncoupling the cars or preventing them from coupling when they run together. By means of these rods J Q and their connecting parts the cars can be uncoupled either while standing still or when in motion without the slightest danger to the brakeman.

Having thus described this invention, I claim—

1. In a car-coupling, the combination of the two arms C, which are united by the coupling-rod D, the hook G, and rod J, having the cam I on its lower end, whereby the hooks can be operated from the top of the car, substantially as shown.

2. The combination of the spring coupling-hook with the cam on the lower end of the operating-rod J, an arm or lever connected to the rod, a coupling-link, and a horizontally-moving rod, Q, substantially as set forth.

In testimony that I claim the foregoing I have hereunto set my hand this 30th day of April, 1880.

ARCHIE. G. HOHENSTEIN.

Witnesses:
B. B. PARKHURST,
J. H. GREENLEAF.